(No Model.)  2 Sheets—Sheet 1.

J. C. ANDERSON.
PROCESS OF AND APPARATUS FOR TREATING WOOL.

No. 553,222.  Patented Jan. 21, 1896.

Witnesses
Edwin L. Bradford
N. Curtis Lammond

James C. Anderson
Inventor

By Wm C. McIntire
Attorney (No Model.) 2 Sheets—Sheet 2.
J. C. ANDERSON.
PROCESS OF AND APPARATUS FOR TREATING WOOL.
No. 553,222. Patented Jan. 21, 1896.
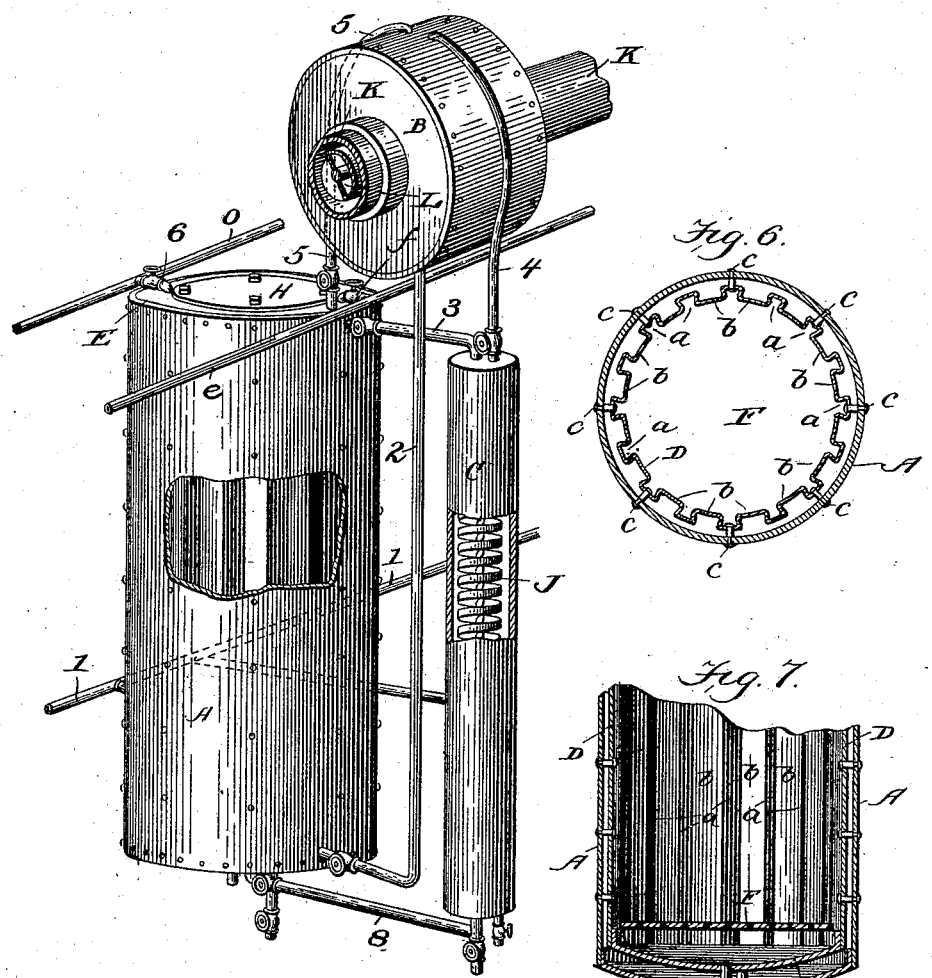
Witnesses
Edwin L. Bradford
N. Curtis Lammond
James C. Anderson
Inventor
By Wm. C. McIntire
Attorney

UNITED STATES PATENT OFFICE.

JAMES C. ANDERSON, OF HIGHLAND PARK, ILLINOIS.

PROCESS OF AND APPARATUS FOR TREATING WOOL.

SPECIFICATION forming part of Letters Patent No. 553,222, dated January 21, 1896.

Application filed April 25, 1895. Serial No. 547,063. (No model.)

*To all whom it may concern:*

Be it known that I, JAMES C. ANDERSON, a citizen of the United States, residing at Highland Park, in the county of Lake and State of Illinois, have invented certain new and useful Improvements in Processes of and Apparatus for the Treatment of Wool; and I do hereby declare the following to be a full, clear, and exact description of the invention, such as will enable others skilled in the art to which it appertains to make and use the same.

My invention relates to certain new and useful improvements in processes of and apparatus for the treatment of animal wool for the purpose of extracting and recovering all grease and other foreign matters and leaving the wool in condition for manufacturing purposes.

In the ordinary manipulation of wool in this country for the market the wool-raiser washes his sheep and then clips the fleece, rolling it up, and then ships to the market in an analogous manner to the shipment of "green" hides, all fatty and volatile constituents which are incorporated with the wool, except such proportion thereof as may naturally escape by evaporation in the atmosphere, remaining in the wool. The foreign constituents thus remaining in the wool are valuable, but their presence deteriorates the commercial value and quality of the wool; and the object of my invention is to eliminate and recover these valuable and objectionable constituents and to leave the wool in a thoroughly cleansed condition and possessing the highest qualities for manufacturing purposes; and with these ends in view my invention consists in the novel steps or method of treatment and the peculiar construction of apparatus hereinafter described.

In order that those familiar with the art may fully understand my invention I will proceed to describe the same, referring by letters and numerals to the accompanying drawings, which show the apparatus I have designed to successfully practice the process, and in which—

Figure 1:
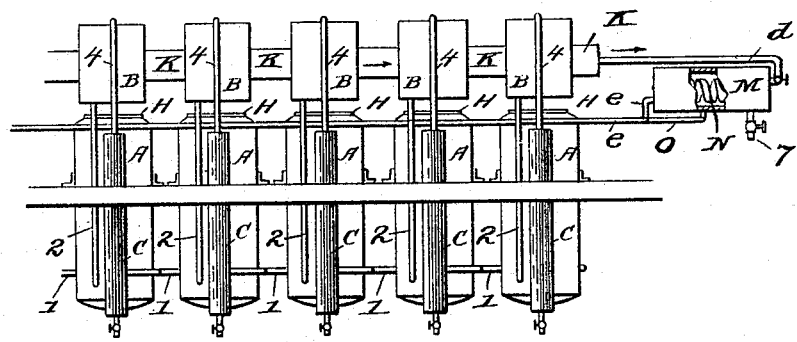
Figure 2:
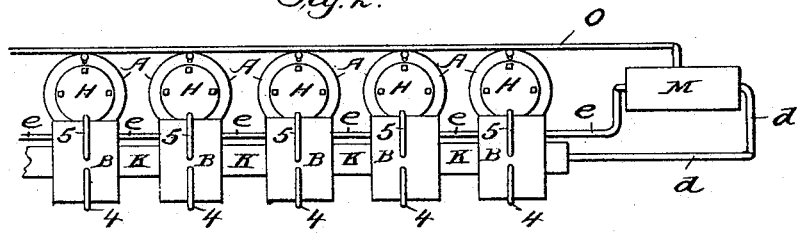
Figure 3:
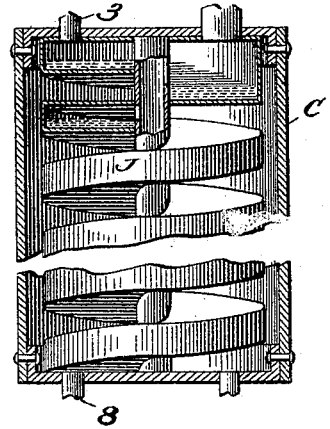
Figure 4:
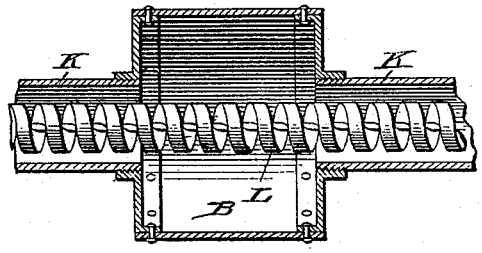

Figure 1 is an elevation of the apparatus; Fig. 2, a top or plan view; Fig. 3, a detail view, on an enlarged scale and partly in section, showing the evaporating device; Fig. 4, a similar view of a condensing device; Fig. 5, an enlarged perspective view of a divisional part of the school of devices employed; Fig. 6, a cross or horizontal section of one of the wool digesting or cleaning tanks; Fig. 7, a transverse or vertical section of the lower portion of the same; and Fig. 8, a bottom view and vertical section of the cover for closing the upper end of the wool-tanks.

Similar letters and numerals denote like parts in the apparatus, which I will first describe.

A represents a series of wool-digesting tanks in general features of construction substantially similar to the tanks shown and described in an application for Letters Patent filed by me on the 25th of January, 1895, Serial No. 536,231, for improvement in garbage treatment, and specifically claimed in another application for Letters Patent filed by me on the 25th day of April, 1895, Serial No. 547,064, for improvement in stills or digesters, but modified, as will be presently explained, to adapt them for use in cleaning wool according to my present invention. B are a series of hydrocarbon-tanks with axially-arranged condensers, and C are a series of evaporators and condensers, each of the general construction shown and described in the two applications hereinbefore referred to, and modified to adapt them for use in carrying forward my present process.

The tanks A are arranged in a battery or series with a corresponding number of the evaporators C and hydrocarbon-tanks B, and connected with one another in the manner presently described.

The tanks A are provided with an interior steam-jacket D of the form shown at Fig. 6, providing comparatively small and constricted channels $a$, and curved and comparatively longer bridges $b$, the object of such construction being to provide for the ready upward flow of the eliminated greases mixed with the liberating hydrocarbon in the vertical channels $a$, while the more extended curved surfaces or bridges $b$ sustain the wool against radial thrust and prevent it from packing and closing the channels $a$. The steam-jacket D is of less circumference and diameter than the tank A and is secured thereto by shoulder-rivets $c$, so that steam admitted between the jacket and the wall of the tank is free to circulate around and in contact with the entire exterior surface of the channels $a$ and bridges $b$.

The ring cover E closes at the top the space between the jacket D and the wall of the tank A, and the latter is provided with a perforated false bottom F and a non-perforated secondary bottom G, providing a steam-space below the latter communicating with the vertical steam-space surrounding the jacket D. The top of the tank A, through which the wool is fed to the same, is closed by a cover H, which is constructed of the form shown at Fig. 8 and bolted in place. Hanging or dropping from the solid upper portion of said cover is a disk-shaped grate I extending below the overflow-point of the space between the tank A and jacket D to prevent the wool from floating up into contact with the under side of the cover and closing the free movement of the grease from the channels $a$ to the exit-pipe.

The evaporators C are provided with a closed and open flighted coil J, and the hydrocarbon-tanks B are connected axially by conduits K, and a continuous double-flighted coil L is arranged axially therein and connected with a water-supply, both as illustrated and described in the two previously-named pending applications.

At one end of the battery or series of hydrocarbon-tanks B is mounted upon suitable supports a secondary condenser M provided with a condensing-coil N similar in construction to the coil L, and a water-pipe $d$ connects the closed flights of the coils L and N, so that the water passing through the coil L in the direction of the arrows to condense the hydrocarbon passes into and through the coil N in the condenser M for the purpose presently explained. The water-pipe $d$ is provided with a suitable valve to shut the water off from the condenser M, if desired, in which case a branch or exit pipe with a valve therein is connected with the pipe $d$ to secure continuous circulation through the coil L if the condensers M should not be in use.

As clearly shown at Fig. 1, the water-pipe $d$ communicates with the closed flight of the coil N in the condenser M, and the opposite end of said closed coil-flight communicates with another water-pipe $e$, which traverses horizontally adjacent to the wool-tanks A, with the interior wool-space of which it communicates by suitable branch pipes $f$, having valves to close or shut off the supply of water to the wool-space of the tanks A when desired.

The pipes and valves connecting the hydrocarbon-tanks B, wool-tanks A, and evaporators C for the purpose of controlling the action of hydrocarbon delivery and condensation, the escape of grease, hydrocarbon, and vapors from the tanks A, and evaporation in the evaporators C and M will be particularly referred to hereinafter in describing the process.

O is a vapor-pipe communicating through branch pipes, and above the grease-exits thereof, with the wool-space in tanks A, and also with the space in the condenser M, surrounding the coil N, for the purpose hereinafter explained when the process is being described.

Having described generally the construction of the apparatus, I will proceed to describe the process of treatment to eliminate and recover the constituents, which are in themselves valuable, but which it is important to separate from the wool, and in order that my process may be more readily understood and disassociated with all other known processes I will state that it has been common to treat wool by what is known as the "boiling process," which involves subjecting the wool to the action of hot water in suitable vessels and scouring the same. The process is not only primitive and ineffectual for the complete extraction of the grease, but also permits the escape to the atmosphere of all volatile products and vapors, which are inherently valuable.

Another common and well-known method of treatment consists in subjecting the wool to the action of alkalies and then washing the wool, all impurities and valuable constituents passing off with effluent waters and being lost, while the wool is left in a harsh and broken-up condition. To overcome the disadvantages attending this primitive process or method of treatment, it has been proposed to treat the wool in closed tanks by saturating it with hydrocarbon solvent, entering at the top of the tank and filtering through the body of wool by gravity to the bottom, where such hydrocarbon mingled with the eliminated greases is withdrawn and by the aid of pumps again returned to the top of the wool-tank to again gravitate through the wool, so that the suspended impurities will be eliminated from the solvent by a sort of filtering process, the wool acting as the filter. This circulation is continued until the solvent, as alleged, appears as a clear solution, which can be then drawn off and distilled to separate the grease and recover the solvent, the remaining valuable matters left in the wool being recovered in well-known ways, and the wool finally washed. The difficulties attending this method of treatment are found in the fact that the continued reuse and return of the hydrocarbon through the wool not only filters out and onto the wool the "suspended impurities," but the grease eliminated by any one of the downward circulations of the solvent is also to a certain extent filtered out and onto the wool at the next downward circulation, and the subsequent washing of the wool, as well as the recovery of the greases and solvent, are accomplished by individual and independent treatment, and this involves the use of extensive and complex apparatus, accompanied by the liability of leakage, &c.

My process is designed to overcome all of the difficulties experienced in the several methods referred to, and involves a continuous treatment within substantially one inclosure, by which all the foreign constituents, including the volatile products, such as ammonia, (and which have heretofore been allowed to go to waste,) are removed and recovered, and the wool finally washed and dried from the core of the fiber outward to the surface, thus leaving the fiber of the wool in a perfectly clean, unbroken, and unfelted condition, and with all the advantages existing in the foreign seasoned wool, as will be best understood by the following detailed description of the manner in which the wool is treated, in which I shall again refer to the apparatus heretofore described, and which I have designed for the purpose.

The wool to be cleaned is placed in one or more of the battery of tanks A, the valves in all of the pipes leading thereto being closed. After a sufficient quantity of wool has been placed in the tank the cover H is bolted in place, the grated disk I holding the wool down, as heretofore stated. Steam is then admitted to the jacket-space of the tank through pipe 1, and sufficient water is then admitted to the wool-space of the tank A to properly moisten the wool. The action of the heat produced by the steam in the jacket serves to expand the wool and to partially loosen the "suint" and other fatty matters. The degree of heat should be such only as is necessary to raise the temperature to a degree below the boiling-point, and yet high enough to eliminate the moisture and produce a vapor, or what may be called a "water-smoke," which vapor, containing volatiles, &c., is carried through the pipe O to the vapor-condenser M, where it is condensed and the volatiles recovered. After the wool has been thus heated to eliminate the volatiles and to thoroughly dry the wool, the hydrocarbon solvent is permitted to flow by gravity from the tank B through conduit-pipe 2, and enter the bottom of wool-tank A, flowing gradually upward through the wool and attacking and liberating the contained suint and other fatty matters. The hydrocarbon holding in solution the fatty matters trickles or flows upward and radially to the vertical channels $a$ of the jacket D till it reaches the overflow grease-pipe 3, by which it is conducted to the closed flight of the coil J in the evaporator C, through which coil it traverses slowly, and under the evaporative action of the steam surrounds said coil, which is admitted through the shell or wall of the evaporator by a branch pipe leading from the steam-supply pipe 1, a suitable valve being employed in the branch pipe to control the passage of steam.

The hydrocarbon vapors generated during the digesting and evaporating process in the coil J escape through the pipe 4, and are delivered to the tank B, where they are condensed, and any similar vapors produced in the digester A are also conducted to the condenser B by a valve-controlled pipe 5.

During the step of moistening and heating the wool in the digesters A the valves in pipes 2, 3, 4, and 5 are closed and the interior or wool space of the digesters A communicates at the top by a valve-controlled branch pipe 6 with a vapor-pipe O, which traverses adjacent to the series of digesters and communicates with the space between the coil N and the walls of the auxiliary condenser M, so that any vapors or volatilized constituents which may be eliminated during the moistening and heating of the wool are condensed and recovered through the valve-controlled spout or pipe 7. After the wool has been thoroughly digested in the digesters A the supply of hydrocarbon is shut off, and all the valves in the pipes connecting therewith are closed except the steam in the supply, the pipe 5, and the valves in the pipes 8, which latter communicate with the bottom of the wool-space and the lower end of the closed flight of coil J of evaporator C. As the evaporation of the hydrocarbon takes place in the evaporator C the column of hydrocarbon in the digester A will fall to natural lines of equilibrium until the entire amount of hydrocarbon which would naturally flow to the evaporator has been duly evaporated and returned to the tanks B. Any hydrocarbon which may be still held in contact with the wool is then vaporized by the heat in the jacket D and escapes through pipe 5, and is returned to the condenser-tanks B. All the valves are then closed except that in the steam-supply, and the valve in the water branch pipe $f$ is opened, through which a supply of water which has been previously utilized in the condensers is admitted upon the body of wool to thoroughly wash the same. The water-supply is then shut off, and the action of the steam surrounding the jacket D causes this body of water to be evaporated at a temperature below the boiling-point of water, or production of steam, the valve in pipe 6 being opened so that the heated vapors containing volatilized products may pass to the auxiliary condenser M to be condensed and any valuable products of condensation recovered through the exit-pipe or drip 7. This process of drying the wool after it has been washed by contact with the water is believed to be a valuable and novel step in the treatment of wool, and analogous to the water-smoking process in the manufacture of bricks, because the moist vapors generated by the surrounding heat keep the exterior surfaces of the wool fibers moist and hot enough to permit and cause the moisture contained within the core or center to travel toward and escape from the surface, and, consequently, the wool is left in an absolutely dry condition, and with no pent-up or confined moisture in the core, as would be the case if the wool is dried, as has heretofore been suggested, by blowing hot air through the mass, which process tends to make a dry crust or envelope on the exterior surface of the fiber, and thus imprison the moisture existing within the center or core. After the wool has thus been thoroughly dried, the cap or cover is removed from the digesters A, and the contents are removed in any suitable manner, and will be found in perfect condition for manufacturing purposes.

As the apparatus is composed of a series of devices it is apparent that while one or more of the wool-digesters are being loaded or unloaded the digesting, evaporating, and condensing may be going on in another series, and the operation thus made continuous and unbroken.

What I claim as new, and desire to secure by Letters Patent, is—

1. The process herein described of treating wool, which consists in subjecting the wool in a moist condition to the action of heat within a closed vessel to liberate the volatile constituents and then condensing and recovering the volatile constituents, substantially as described.

2. The process herein described for treating wool which consists first in subjecting the wool in a moist condition in a closed vessel to the indirect action of heat to soften and partially liberate the suint and other fatty matters and recovering the volatilized products, second in saturating the wool with a hydrocarbon or other suitable solvent to collect and husband the suint and other fatty matters while still subjected to the action of indirect heat, third subjecting the hydrocarbon and commingled fatty matters to evaporation, by the action of indirect heat, fourth recovering the fatty matters and condensing for re-use the hydrocarbon solvent, fifth washing the wool in a closed vessel, and, finally, drying the wet wool by the application of indirect heat in the manner described and recovering any valuable constituents set free by vaporization, substantially as hereinbefore set forth.

3. The process herein described of drying moistened wool which consists in subjecting the same in a closed vessel to the action of indirect heat at a point below the boiling or steam producing temperature for the purpose of keeping the surface moist and extracting the moisture from the core or center and continuing this treatment until the entire body is dried, and at the same time conducting away and condensing and recovering the products of vaporization, substantially as hereinbefore described.

4. In an apparatus for the treatment of wool, a series or battery of digesters A provided with steam jackets D, a series of solvent tanks B with a continuous condensing coil L, a series of evaporators C provided with evaporating coils J, an auxiliary condenser M with coil N, a water supply pipe $d$ connecting the coil in the tanks B and the coil in the auxiliary condenser M, a water pipe $e$ connecting the coil N and communicating with the wool space of the digesters A, the steam pipe 1 communicating by suitable valved connections with the digesters A and evaporators C, and the vapor pipe O, connecting the digesters and the auxiliary condenser, substantially as and for the purposes hereinbefore set forth.

5. The digester A provided with a steam jacket D having constricted fluid channels $a$ and extended bridges $b$, the diameter of the steam jacket being less than the diameter of the digester, and the jacket and digester connected in concentric relation by shoulder rivets $c$ to produce a continuous space for the circulation of steam, substantially as described.

6. In combination with the digester A and jacket D, formed with the constricted channels $a$ and bridges $b$, the cover or cap H formed or provided with the depending grated disk I, substantially as and for the purpose set forth.

7. In combination with the digesters A, solvent tanks B and vapor conduit O, an intermediate condenser M between the solvent tanks B and digesters A, and water supply pipes $d$, $e$, substantially as and for the purposes set forth.

In testimony whereof I affix my signature in presence of two witnesses.

J. C. ANDERSON.

Witnesses:
   WM. C. MCINTIRE,
   N. CURTIS LAMMOND.